(12) United States Patent
Bodwell et al.

(10) Patent No.: US 9,725,624 B2
(45) Date of Patent: Aug. 8, 2017

(54) PROCESS FOR MANUFACTURE OF POLYMER FILM GRAPHICS

(75) Inventors: James Bodwell, Concord, OH (US); Michael W. Roughton, South Plainfield, NJ (US); David Welch, Crewkerne (GB)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 11/689,617

(22) Filed: Mar. 22, 2007

(65) Prior Publication Data
US 2007/0231525 A1    Oct. 4, 2007

Related U.S. Application Data

(60) Provisional application No. 60/788,386, filed on Mar. 31, 2006.

(51) Int. Cl.
*C09J 7/02*     (2006.01)
*B32B 27/00*    (2006.01)
(Continued)

(52) U.S. Cl.
CPC ............. *C09J 7/0296* (2013.01); *B32B 3/10* (2013.01); *B32B 7/06* (2013.01); *B32B 7/12* (2013.01); *B32B 27/00* (2013.01); *B32B 27/08* (2013.01); *B32B 27/10* (2013.01); *B32B 27/18* (2013.01); *B32B 27/22* (2013.01); *B32B 27/304* (2013.01); *B32B 29/06* (2013.01); *B41M 7/009* (2013.01); *B41M 7/0081* (2013.01); *B44C 1/162* (2013.01); *B32B 2255/12* (2013.01);
(Continued)

(58) Field of Classification Search
USPC ....................................... 427/207.1
See application file for complete search history.

(56) References Cited

U.S. PATENT DOCUMENTS 4,028,474 A    6/1977 Martin ............................ 428/40
4,038,123 A    7/1977 Sammis ....................... 156/240
(Continued)

FOREIGN PATENT DOCUMENTS

EP    0 241 212 A2    10/1987

OTHER PUBLICATIONS

International Search Report from corresponding International Application No. PCT/US2007/064588 mailed Oct. 12, 2007.

*Primary Examiner* — Xiao Zhao
(74) *Attorney, Agent, or Firm* — Mark E. Bandy; Rankin, Hill & Clark LLP

(57) ABSTRACT

The invention relates to a process for the manufacture of polymer film graphics comprising providing a continuous substrate having a release layer thereon; applying an image layer in the shape of a graphic letter or design to the release layer; depositing an adhesive layer to the image layer and which has the same shape as the image layer graphic letter or design; curing the adhesive and image layers; and winding the polymer film graphics onto rolls. The invention further relates to a polymer film graphic comprising a substrate having an upper surface and a lower surface; a release layer overlying the upper surface of the substrate; an image layer in the shape of a graphic letter or design overlying the release layer; an adhesive layer overlying the image layer, the adhesive layer having the same shape as the image layer graphic letter or design.

20 Claims, 6 Drawing Sheets

(51) Int. Cl.

| | | |
|---|---|---|
| *B44C 1/16* | (2006.01) | |
| *B32B 7/06* | (2006.01) | |
| *B32B 7/12* | (2006.01) | |
| *B32B 27/08* | (2006.01) | |
| *B32B 27/10* | (2006.01) | |
| *B32B 27/18* | (2006.01) | |
| *B32B 27/22* | (2006.01) | |
| *B32B 27/30* | (2006.01) | |
| *B32B 29/06* | (2006.01) | |
| *B32B 3/10* | (2006.01) | |
| *B41M 7/00* | (2006.01) | |

(52) U.S. Cl.
CPC ... *B32B 2255/26* (2013.01); *B32B 2307/4023* (2013.01); *B32B 2307/75* (2013.01); *C09J 2201/28* (2013.01); *C09J 2433/00* (2013.01); *Y10T 428/14* (2015.01); *Y10T 428/2486* (2015.01)

(56) References Cited

U.S. PATENT DOCUMENTS

| | | | |
|---|---|---|---|
| 4,898,848 A * | 2/1990 | Shibata | 503/200 |
| 5,021,275 A | 6/1991 | Kim | 428/42 |
| 5,169,681 A | 12/1992 | Kim | 427/147 |
| 5,186,787 A | 2/1993 | Phillips et al. | 156/631 |
| 5,262,215 A | 11/1993 | Shields | 428/40 |
| 5,284,688 A * | 2/1994 | Hiatt | 428/41.4 |
| 5,312,645 A | 5/1994 | Dressler | 427/148 |
| 5,686,170 A | 11/1997 | Condon et al. | 428/207 |
| 5,779,370 A * | 7/1998 | Schroeder et al. | 400/120.01 |
| 5,814,402 A | 9/1998 | Smith | 428/354 |
| 6,074,721 A | 6/2000 | Moore et al. | |
| 6,258,199 B1 | 7/2001 | Lingamfelter et al. | 156/235 |
| 6,280,553 B1 | 8/2001 | Yang | 156/235 |
| 6,482,285 B2 | 11/2002 | Cross | 156/230 |
| 6,613,412 B1 | 9/2003 | Dressler | 428/41.8 |
| 6,703,089 B2 | 3/2004 | DeProspero et al. | 428/32.76 |
| 6,811,840 B1 | 11/2004 | Cross | 428/32.62 |
| 2001/0001047 A1 * | 5/2001 | Nelson et al. | 428/349 |
| 2002/0192415 A1 * | 12/2002 | Vogler et al. | 428/40.1 |
| 2003/0017772 A1 * | 1/2003 | Sloot | 442/59 |
| 2003/0025323 A1 * | 2/2003 | Unglert et al. | 283/106 |
| 2003/0035933 A1 | 2/2003 | Stahl | |
| 2003/0064188 A1 * | 4/2003 | Patel | C09J 7/0235 428/40.1 |
| 2003/0104179 A1 * | 6/2003 | Weder | 428/195 |
| 2003/0107709 A1 * | 6/2003 | Rodick | 353/1 |
| 2004/0218238 A1 * | 11/2004 | Xie et al. | 359/3 |
| 2005/0074606 A1 * | 4/2005 | Nishiyama et al. | 428/354 |
| 2005/0153113 A1 * | 7/2005 | Hseih et al. | 428/201 |
| 2005/0266195 A1 * | 12/2005 | Nonaka et al. | 428/40.1 |

* cited by examiner

PROCESS FOR MANUFACTURE OF POLYMER FILM GRAPHICS

RELATED APPLICATIONS

This application claims priority to U.S. Provisional Application No. 60/788,386, filed Mar. 31, 2006. The entire disclosure of the provisional application is hereby incorporated by reference.

TECHNICAL FIELD OF THE INVENTION

The invention relates to a process for manufacturing polymer film graphics, useful as lettering and free form designs, and formation of the graphics without the necessity for cutting the graphics from the polymer film.

BACKGROUND OF THE INVENTION

Graphics cutting methods wherein an image is cut from a polymer film adhered to a pressure sensitive adhesive composite and then transferred to a desired substrate are known. This technique is used to provide a wide variety of graphics applications including exterior identification signs, lettering and designs, as well as decorative or commercial graphics on trucks, cars, boats, and the like. The polymer film that is typically used with these graphic applications is a calendered or dispersion cast polyvinyl chloride (PVC) monolayer film. While the use of PVC films have met with success in the marketplace, such films are often costly to manufacture and typically result in film waste associated with the portion of film discarded after cutting of the lettering or design. This removal step is sometimes referred to in the art as "weeding". Weeding involves peeling the unneeded portions of a film from the release liner, leaving only the needed portions representing the final image adhered to the release liner.

Therefore, it is desirable to provide a process for manufacturing a polymer film graphic that eliminates the waste film associated with wide web coating. It is also desired to provide a process for forming a polymer film graphic that eliminates the subsequent cutting of the graphic from application to a surface.

SUMMARY OF THE INVENTION

In one embodiment, the invention is directed to a process for the manufacture of polymer film graphics comprising providing a continuous substrate having a first and second surface, and having a first release layer on the first surface; applying an image layer in the shape of a graphic letter or design to the first release layer; depositing an adhesive layer onto the image layer, the adhesive layer having the same shape as the image layer graphic letter or design; and curing the adhesive and image layers. The polymer film graphic may be wound into a roll.

In another embodiment, the invention is directed to a process for the manufacture of polymer film graphics comprising: providing a continuous substrate having a first surface and a second surface and having a first layer of adhesive on the first surface; printing an image layer in the shape of a graphic letter or design onto the first layer of adhesive; applying a second release layer on the image layer prior to depositing the adhesive layer, the adhesive layer having the same shape as the image layer graphic letter or design; and curing the adhesive layer and image layer.

In a further embodiment, the invention is directed to a polymer film graphic comprising a substrate having an upper surface and a lower surface; a release layer overlying at least the upper surface of the substrate; an image layer in the shape of a graphic letter or design overlying the release layer; and an adhesive layer overlying the image layer in the same shape as the image layer graphic letter or design. The polymer film graphic may further comprise a second release layer on the lower surface of the substrate.

DESCRIPTION OF THE INVENTION

The present invention relates to graphic letters and free form designs formed from a polymer film without the necessity for cutting of the lettering or design. The term "overlies" and cognate terms such as "overlying" and the like, when referring to the relationship of one or a first layer relative to another or a second layer, refers to the fact that the first layer partially or completely overlies the second layer. The term "underlies" and cognate terms such as "underlying" and the like have similar meanings except that the first layer partially or completely lies under, rather than over, the second layer.

The term "transparent" when referring to one or more layers of the graphic means that the ink or print layer(s) can be seen through such layer or layers.

Figure 1:
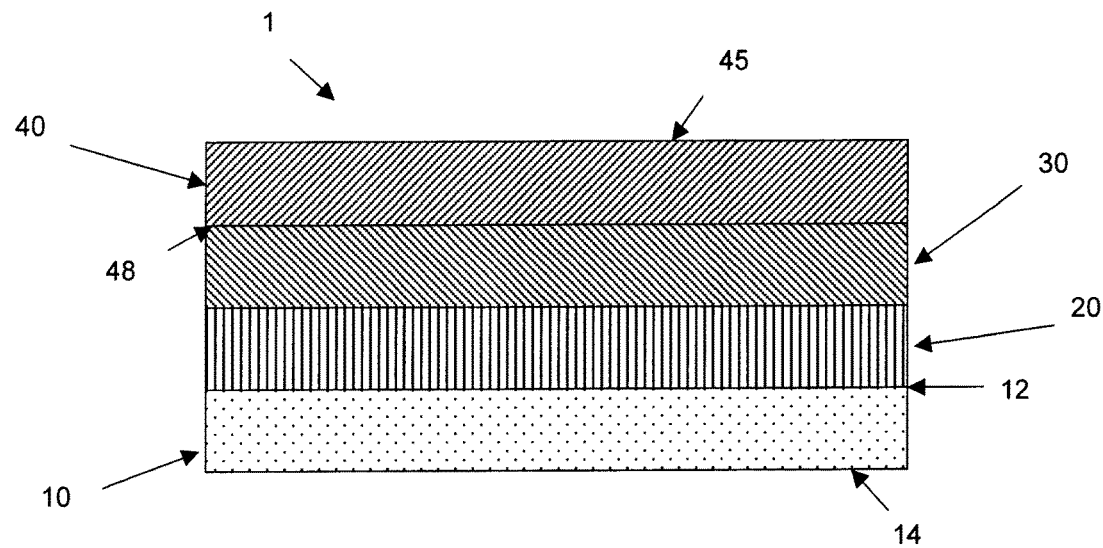
FIG. 1 is a schematic illustration of the side view of a film embodying the present invention in a particular form.

The graphic letters and designs of the present invention are illustrated in reference to the attached drawings. FIG. 1 is a schematic illustration of a side view of a graphic 1 produced according to the present invention. Graphic 1 comprises a substrate or casting sheet 10 having an upper surface 12 and a lower surface 14. Overlying upper surface 12 of substrate 10 is a first release layer 20. An image layer 30 in the shape of a graphic letter or design overlies the first release layer 20 on the substrate 10. An adhesive layer 40 having upper surface 45 and lower surface 48 overlies the image layer 30 and has the same shape as the graphic letter or design of image layer 30.

The image layer is formed on a substrate or casting sheet 10 which may comprise paper, polymer film, or a combination thereof. Paper substrates are useful because of the wide variety of applications in which they can be employed. Paper is also relatively inexpensive and has desirable properties such as antiblocking, antistatic, dimensional stability, and can potentially be recycled. Any type of paper having sufficient tensile strength to be handled in conventional paper coating and treating apparatus can be employed as the substrate material. Thus, any type of paper can be used depending upon the end use and particular personal preferences. Included among the types of paper which can be used are clay coated paper, glassine, polymer coated paper, hemp, and similar cellulose material prepared by such processes as the soda, sulfite or sulfate (Kraft) processes, the neutral sulfide cooking process, alkali-chlorine processes, nitric acid processes, semi-chemical processes, etc. Although paper of any weight can be employed as a substrate material, paper having weights in the range of from about 30 to about 120 pounds per ream are useful, and papers having weights in the range of from about 60 to about 100 pounds per ream are presently preferred. The term "ream" as used herein equals 3000 square feet.

Alternatively, the substrate 10 may be a polymer film, and examples of polymer films include polyolefin, polyester, PET, and the like. The polyolefin films may comprise polymer and copolymers of monoolefins having from 2 to about 12 carbon atoms, and in one embodiment from 2 to about 8 carbon atoms, and in one embodiment from about 2 to about 4 carbon atoms per molecule. Examples of such homopolymers include polyethylene, polypropylene, poly-1-butene, etc. The examples of copolymers within the above definition include copolymers of ethylene with from about 1% to about 10% by weight of ethylene or 1-butene, etc. Films prepared from blends of copolymers or blends of copolymers with homopolymers are also useful. The films may be extruded in mono or multilayers. In one embodiment, the substrate 10 is a naturally releasing low surface energy film of polypropylene, polyethylene, polyacrylate or polyacetal polymer and copolymers, or combinations thereof. The surface energy of these films will range from about 10 dynes/cm to about 30 dynes/cm.

Another type of material that can be used as the substrate 10 is a polycoated kraft liner that is basically comprised of a kraft liner that is coated on either one or both sides with a polymer coating. The polymer coating, which can be comprised of high, medium, or low density polyethylene, propylene, polyester, and other similar polymer films, is coated onto the substrate surface to add strength and/or dimensional stability to the liner. The weight of these types of liners ranges from about 30 to about 100 pounds per ream, with about 94 to about 100 pounds per ream representing a typical range. In total, the final liner is comprised of between 10% and 40% polymer and from 60% to 90% paper. For two sided coatings, the quantity of polymer is approximately evenly divided between the top and bottom surface of the paper.

In one embodiment, overlying the upper surface 12 of substrate 10, is release layer 20. The composition of the release layer 20 can be any release coating composition known in the art. Silicone release coating compositions are preferred, and any of the silicone release coating compositions that are known in the art can be used. The major component of the silicone release coating is a polyorganosiloxane and more often polydimethylsiloxane. The silicone release coating compositions used may be room temperature cured, thermally cured, or radiation cured. Generally, the room temperature and thermally curable compositions comprise at least one polyorganosiloxane and at least one catalyst (or curing agent) for such polyorganosiloxane(s). Such compositions may also contain at least one cure accelerator and/or adhesivity promoter. As is known in the art, some materials have the capability of performing both functions, i.e., the capability of acting as a cure accelerator to increase the rate, reduce the curing temperature, etc., and also as an adhesivity promoter to improve bonding of the silicone composition to the substrate. The use of such dual function additives where appropriate is within the purview of the invention.

The release coating composition is applied to the substrate 10 using known techniques. These include, for example, gravure, reverse gravure, offset gravure, roller coating, brushing, knife-over roll, metering rod, reverse roll coating, doctor knife, dipping, die coating, spraying curtain coating, and the like. In one embodiment, the thickness or caliper of the resulting release coating may range from about 0.1 to about 20 mils, and in one embodiment from about 0.2 to about 0.5 mils.

In one embodiment, substrate 10 has a first release layer 20 on upper surface 12 and a second release layer on lower surface 14. Upon rolling or stacking the graphic, the upper surface 45 of adhesive layer 40 comes into contact with the second release layer.

Figure 2:
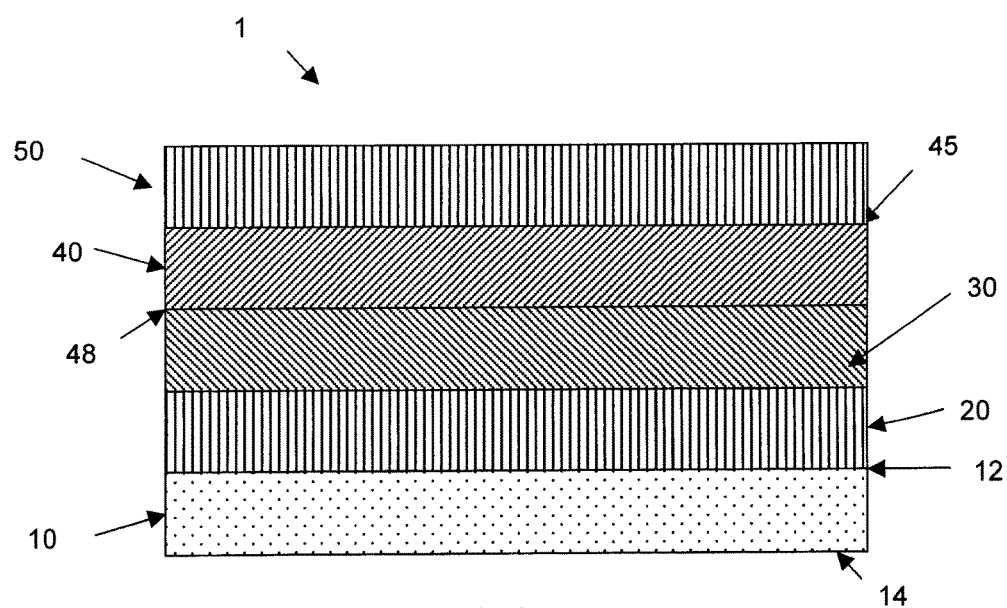
FIG. 2 is a schematic illustration of the side view of an alternative embodiment of the present invention.

As illustrated in FIG. 2, in one embodiment, the polymer graphic 1 of the invention may optionally comprise a carrier 50 which is a release-coated liner having one surface (the release-coated surface) in contact with the otherwise exposed upper surface 45 of adhesive layer 40 when the graphics 1 are stacked or otherwise rolled upon themselves. The carrier 50 is used to protect the upper surface 45 of the adhesive layer 40 during preparation, handling, storage and shipping of the graphics 1. The carrier 50 is removed from the graphic 1 prior to positioning and adhering the graphic 1 to a surface. The release-coated liner 50 may comprise a substrate sheet of paper, a polymer film or combinations thereof coated with a release composition. Such materials are as described with reference to the substrate 10.

Image layer 30 is formed in the shape of a letter or free form design and applied over the release layer 20. In one embodiment, the image layer 30 comprises a plastisol or organosol. The term plastisol or organosol generally refers to a dispersion of fine-particle plastic powders or granules in softeners that harden or gelate when heated to higher temperatures. The plastisol formulation that is applied to the substrate 10 comprises a resin, a plasticizer, and optionally an activator/stabilizer, a viscosity depressant, a pigment, and filler. The plastic powders or granules are composed of fine particle polymers and copolymers including vinyl chloride polymers, polyvinyl chloride-vinyl acetate copolymers, acrylate polymers and copolymers such as polymethyl methacrylate (PMMA) and polyalkyl methacrylate (PAMA); polyolefins such as polyethylene, including high density polyethylene, low density polyethylene, linear low density polyethylene, and linear ultra low density polyethylene, polypropylene, and polybutylene; polyesters; polycarbonate; polyacrylonitrile; butadiene-styrene polymers; polyamide; ethylene vinylacetate copolymer; treated and untreated poly(ethylene terephthalate); polystyrene; vinyl copolymers; polyvinyl acetates; olefinic copolymers such as ethylene/methacrylate copolymers, ethylene/vinyl acetate copolymers; acrylonitrile-butadiene-styrene copolymers; ethylene/propylene copolymers; acrylic polymers and copolymers; polyurethanes; and combinations of the foregoing. The vinyl chloride polymers that may be used are the resinous products obtained by the polymerization of vinyl chloride in the presence or absence of another copolymerizable vinyl compound. The term "vinyl chloride resin" includes vinyl chloride homopolymers as well as copolymers, such as those formed between vinyl chloride and at least one other copolymerizable vinyl monomer, such as vinyl acetate, vinyl propionate, vinyl butyrate, vinylidene chloride, styrene, methyl-methacrylate, and the like. In one embodiment the plastisol contains a PVC resin.

Plasticizers for making poly(vinyl chloride) plastisols are well known in the art and commercially available. Typical plasticizers include di(2-ethylehexyl)phthalate, di(2-ethyl-4-methylpentyl)phthalate, di-capryl phthalate, di-isodecyl phthalate, di-capryl phthalate, di-isodecyl phthalate, di(2-ethylhexyl)sebacate, di(2-ethylhexyl)azelate, monomeric epoxy(2-ethyl-hexylepoxytallate), triethylene glycol dicaprylate, acetyl tributyl citrate, 2,2,4-trimethylpentane-1,3-diol diisobutyrate, polyester of neopentyl glycol and adipic acid (M.W.=1,200-1,300), epoxidized soy bean oil (M.W. approximately 1,000), high boiling (above about 200° C.) liquid mixture of partially hydrogenated terphenyls and iso-octyl palmitate, dioctyl phthalate, mixed phthalate esters containing alcohol moieties having 7 to 11 carbon atoms, diisononyl phthalate, diisooctyl phthalate, dioctyl terephthalate, mixed phthalate esters based on isomeric nonyl alcohols, mixed phthalate esters containing alcohol moieties having 6 to 12 carbon atoms, trioctyl trimellitate, butyl benzyl phthalate, and polymeric plasticizers such as poly(2,2,4-trimethyl-1,3-pentanediol adipate)terminated with the monoisobutyrate acid ester of 2,2,4-trimethyl-1,3-pentanediol, and poly(2,2-dimethyl-1,3-propanediol adipate)terminated with 2-ethylhexanol and the like. Cost considerations as well as desired viscosity and adhesion properties of the system affect the specific plasticizer choice. Where lower viscosity is desired without further plasticizer, for example, for spray coating application, small amounts of a diluent (5-15%) such as toluene, xylene, methyl isoamyl ketone, diisobutyl ketone, methyl ethyl ketone, and the like may be added to form the sprayable organosol.

Mixtures of the above identified plasticizers may be used if desired. Normally, the plasticizer will be present in the plastisol in the amount of about 20 to about 130 parts per hundred parts (pph) of vinyl chloride resin. The plasticizers may be incorporated in the vinyl chloride resin alone with or without other additives, by a suitable process such as calendering, mixing or kneading of the ingredients. A desirable procedure involves forming a vinyl resin dispersion that can be cast in a film or thicker body, and then heated to form a homogenous body of plasticized resin. Such dispersions are suspensions of vinyl chloride resin particles in nonaqueous liquids, including the plasticizer, which do not dissolve the resin at ordinary temperature but do at elevated temperatures. If the liquid phase consists of plasticizer only, the dispersion is often termed as "plastisol", whereas if the dispersing liquid also contains volatile components that evaporate upon heating, the dispersion is often termed as "organosol". Commercially available examples of plastisol/organosol polymer useful in the present invention include those manufactured by Polyone and Chemionics.

In one embodiment, the image layer 30 is formed from a polymeric material, such as polyethylene, polypropylene, an acrylic, an epoxy, copolymers and the like. Useful acrylate polymers and copolymers for forming the liquid material layer 30 include polyacrylate and methacrylate homopolymers or copolymers of $C_1$-$C_{12}$ acrylate or methacrylate monomers, such as methyl, ethyl, propyl, butyl, hexyl, or octyl acrylates or methacrylates. Commercial examples of available polymers include those produced by Acronal® Acrylics from BASF, Rohm and Haas Rhoplex®, Plexiglas®, and Lucidene products.

Epoxy resins useful for making the image layer 30 include epoxy resins and polymeric epoxy resins. These resins can vary greatly in the nature of their backbones and substituent groups. The epoxy resins of the invention can undergo initial curing upon exposure to UV radiation via a free radical mechanism with the addition of an appropriate photoinitiator. Final curing of the epoxy resin layer is accomplished by heating the epoxy resin. A particularly useful epoxy layer is formed from a mixture of a diglycidyl ether of bisphenol A, an epoxy diacrylate and an amine curing agent. Epon® 825, a bisphenol A epichlorohydrin epoxy resin commercially available from Shell Chemical Co., is an example of a diglycidyl ether of bisphenol A. An epoxy diacrylate useful in the present invention is Ebecryl® 3700, a bisphenol A epoxy diacrylate commercially available from UCB Chemical Corp.

In one embodiment, the image layer 30 is formed from a polymer that can be dispersed or dissolved in solvents or water, as are known in the art. Such polymers include, but are not limited to polycarbonate, polyacrylonitrile, butadiene-styrene polymers, poly(methylmethacrylate), polyamide, ethylene vinylacetate copolymer, treated and untreated poly(ethylene terephthalate), polystyrene, polyolefins, such as polyethylene, including high density polyethylene, low density polyethylene, linear low density polyethylene, and linear ultra low density polyethylene, polypropylene, and polybutylenes; vinyl copolymers, and polyvinyl acetates, olefinic copolymers, such as ethylene/methacrylate copolymers, ethylene/vinyl acetate copolymers, acrylonitrile-butadiene-styrene copolymers, and ethylene/propylene copolymers; acrylic polymers and copolymers; polyurethanes; and mixtures thereof.

The image layer 30 can be pigmented or can be transparent. In one embodiment, the image layer 30 is pigmented. The pigment can be a metallic pigment, heavy metal-based pigment, a heavy-metal free pigment, or an organic pigment. A heavy metal is defined herein as being lead, cadmium, chromium, or antimony. The pigments that can be used include titanium dioxide, both rutile and anatase crystal structure. The titanium dioxide may be coated or uncoated (e.g. aluminum oxide coated $TiO_2$).

In one embodiment, pigment is added to image layer 30 in the form of a concentrate containing the pigment and a resin carrier. The concentrate may contain, for example from about 20% to about 80% by weight pigment, and about 20% to about 80% by weight resin carrier. The resin carrier can be any thermoplastic polymer having a glass transition temperature, in one embodiment, from about −70° C. up to about 150° C. and in one embodiment, from about 100° C. to about 175° C. The carriers resins include polyolefin, thermoplastic polymers of ethylene and propylene, a polyester, a polycarbonate, a styrene derived polymer, a polyurethane, a polyacryl, a polymethacryl, a polyvinyl alcohol, a polyamide, a polyimide, a polysulfone, a polymethylpentene, a polyacetyl, a vinyl halide derived polymer, a poly(ethylene vinyl alcohol), a vinyl acetate derived polymer, an ionomer, and mixtures thereof. In one embodiment, a titanium dioxide concentrate is used which is comprised of a blend of about 30% to about 70% by weight polypropylene and about 70% to about 30% by weight titanium dioxide. An example of a commercially available pigment concentrate that can be used is available from A. Schulman under the tradename Polybatch White P8555 SD, which is identified as a white color concentrate of 50% by weight in a polypropylene homopolymer carrier resin. Examples of other pigment concentrates include, but are not limited to Ampacet 150380, identified as a red pigment concentrate, Ampacet 190303, identified as a black pigment concentrate; Ampacet LR-87132 Orange PE MB, identified as a lead molybdate concentrate, all available from Ampacet Corporation. The heavy metal-free pigment concentrates that can be used include Ampacet LR-86813 Yellow UV PE MB, Ampacet LR-86810 Red PE MB, Ampacet LR-86816 Orange PE MB, and Ampacet LR-86789 Red UV PE MB. The concentration of the pigment in the liquid film material can be up to about 25% by weight, and in one embodiment about 5% to about 25% by weight, and in one embodiment about 10% to about 20% by weight.

In one embodiment, color can be imparted to the image layer 30 by use of a dye-based ink. The inks used include commercially available water-based, solvent-based or radiation curable inks. Examples of such inks include Sun Sheet (a product of Sun Chemical identified as an alcohol dilutable polyamide ink), Suntex MP (a product of Sun Chemical identified as a solvent-based ink), X-Cel (a product of Water Ink Technologies identified as a water-based film ink), Uvilith AR-109 Rubine Red (a product of Daw Ink identified as a UV ink) and CLA91598F (a product of Sun Chemical identified as a multibond black solvent-based ink).

In one embodiment, the image layer 30 is produced from printed ink. Suitable inks include the Color+ series of solvent based inks commercially available from Fujifilm Sericol USA, Inc. of Kansas City, Kans. The ink can be applied through the use of digital format printers such as the Indigo® printers available from Hewitt Packard or Palo Alto, Calif., or wide format printers such as those available from Mimaki Engineering Company of Japan under the trade name Mimaki.

In one embodiment, pigment is added to adhesive layer 40. When pigmented, the adhesive layer 40 can contain one or more of the pigments described above. The pressure sensitive adhesive layer 40 can be any pressure sensitive adhesive known in the art. These include rubber based adhesives, acrylic adhesives, vinyl ether adhesives, silicone adhesives, and mixtures of two or more thereof. Included are the pressure sensitive adhesive materials described in "Adhesion and Bonding," *Encyclopedia of Polymer Science and Engineering*, Vol. 1, pages 476-546, Interscience Publishers 2$^{nd}$ Ed. 1985, the disclosure of which is hereby incorporated by reference. The pressure sensitive adhesive materials that are useful may contain as a major constituent an adhesive polymer such as acrylic type polymers, block copolymers, natural, reclaimed or styrene butadiene rubbers, tackified nature or synthetic rubbers, random copolymers of ethylene and vinyl acetate, ethylene-vinyl-acrylic terpolymers, polyisobutylene, poly(vinyl ether), etc. The pressure sensitive adhesive materials are typically characterized by glass transition temperatures in the range of about −70° C. to about 110° C.

Other materials in addition to the foregoing resins may be included in the pressure sensitive adhesive layer 40. These include solid tackifying resins, liquid tackifiers (often referred to as plasticizers), antioxidants, fillers, pigments, waxes, etc. The adhesive materials may contain a blend of solid tackifyng resins and liquid tackifying resins (or liquid plasticizers).

The layer 40 of pressure sensitive adhesive generally has a thickness of about 0.2 to about 2.5 mils, and in one embodiment about 0.5 to about 1.5 mils. In one embodiment, the coat weight of the pressure sensitive adhesive is in the range of about 10 to about 50 grams per square meter (gsm), and in one embodiment about 20 to about 35 gsm.

The image layer 30 also may include additives other than plasticizers that are normally incorporated in vinyl resin compositions. Generally such compositions include one or more stabilizers to impart resistance to thermal degradation. Inorganic fillers, either fibrous or non-fibrous, may be used where desirable. In addition, other additives, such as solvents, diluents, binders and the like may be employed. The image layer 30 also may include other materials such as antioxidants, light stabilizers such as (UV) light absorbers and/or other light stabilizers, viscosity modifiers, antiblock and/or slip additives, reinforcing agents, processing acids, mineral oil, and the like. In one embodiment, stabilizers in addition to those normally present in PVC plastisol formulations may be included. Examples of such stabilizers include ultraviolet light stabilizers including hindered amine light stabilizers. The hindered amine light stabilizers may, for example, be derivatives of 2,2,6,6-tetraalkyl piperidines or substituted piperizinediones. A number of hindered amine light stabilizers useful in the invention are available commercially such as from Ciba-Geigy Corporation under the general trade designation "Tinuvin" and "Chemissorb", and from Cytec under the general designation "Cyasorb-UV". Examples include Tinuvin 783 which is identified as a mixture of poly [[60[1,1,3,3-tetramethyl butyl)amino]-1,3, 5-trizine-2,4-diyl][[2,2,6,6-tetramethyl-4-piperidyl)imino] hexamethylene[2,2,6,6-tetramethyl-4-piperidyl imino]] and dimethyl succinate polymer with 4-hydroxy-2,2,6,6-tetramethyl-1-piperidineethanol; Tinuvin 770 which is identified as bis-(2,2,6,6-tetramethyl-4-piperidinyl)-sebacate; Tinuvin 765 which is identified as bis-(1,2,2,6,6-pentamethyl-4-piperidinyl)-sebacate; Tinuvin 622 which is a polyester of succinic acid and N-beta-hydroxy ethyl-2,2,6,6-tetramethyl-4-hydroxy-piperidine; and Chemissorb 944 which is poly [6-(1,1,3,3-tetramethyl butyl)amino]-s-triazine-2,4-diy[[2,2, 6,6-tetramethyl-4-piperidyl)imino]hexamethylene (2,2,6,6-tetramethyl-4-piperidyl)imino]. A useful stabilizer is available under the tradename Ampacet 10561 which is a product of Ampacet identified as a UV stabilizer concentrate containing 20% by weight of a UV stabilizer and 80% by weight of a low density polyethylene carrier resin; the UV stabilizer in this product is Chemissorb 944. Useful light stabilizers are also provided in Ampacet 150380 and Ampacet 190303, both of which are pigment concentrates discussed above. Ampacet 150380 has a UV stabilizer concentration of 7.5% by weight. Ampacet 190303 has a UV stabilizer concentration of 4% by weight. The UV stabilizer in each of these products is Chemissorb 944. Ampacet LR-89933 is a grey concentrate having a UV stabilizer concentration of 4.5% by weight, the UV stabilizer being Tinuvin 783. Heat stabilizers include epoxies such as Thermcheck 909, and barium/zinc heat stabilizers such as Mark 121 from Crompton Industries.

The image layer 30 may contain antiblock and/or slip additives. The antiblock additives include natural silica, diatomaceous earth, synthetic silica, glass spheres, ceramic particles, etc. The slip additives include primary amides such as stearamide, behenamide, oleamide, erucamide, and the like; secondary amides such as stearyl erucamide, erucyl erucamide, oleyl palimitamide, stearyl stearamide, erucyl stearamide, and the like; ethylene bisamides such as N,N'-ethylenebisstearamide, N,N'-ethylenebisolamide and the like; and combinations of any two or more of the foregoing amides. An example of a useful slip additive is available from Ampacet under the trade designation 10061; this product is identified as a concentrate containing 6% by weight of a stearamide slip additive. The antiblock and slip additives may be added together in the form of a resin concentrate. An example of such a concentrate is available from DuPont under the tradename Elvax CE9619-1. This resin concentrate contains 20% by weight silica, 7% by weight of an amide slip additive, and 73% by weight of Elvax 3170 (a product of DuPont identified as an ethylene/vinyl acetate copolymer having a vinyl acetate content of 18% by weight). The antiblock additive can be used at a concentration in the range of up to about 1% by weight, and in one embodiment about 0.01% to about 0.5% by weight. The slip additive can be used at a concentration in the range of up to about 1% by weight, and in one embodiment about 0.01% to about 0.5% by weight.

Figure 4:
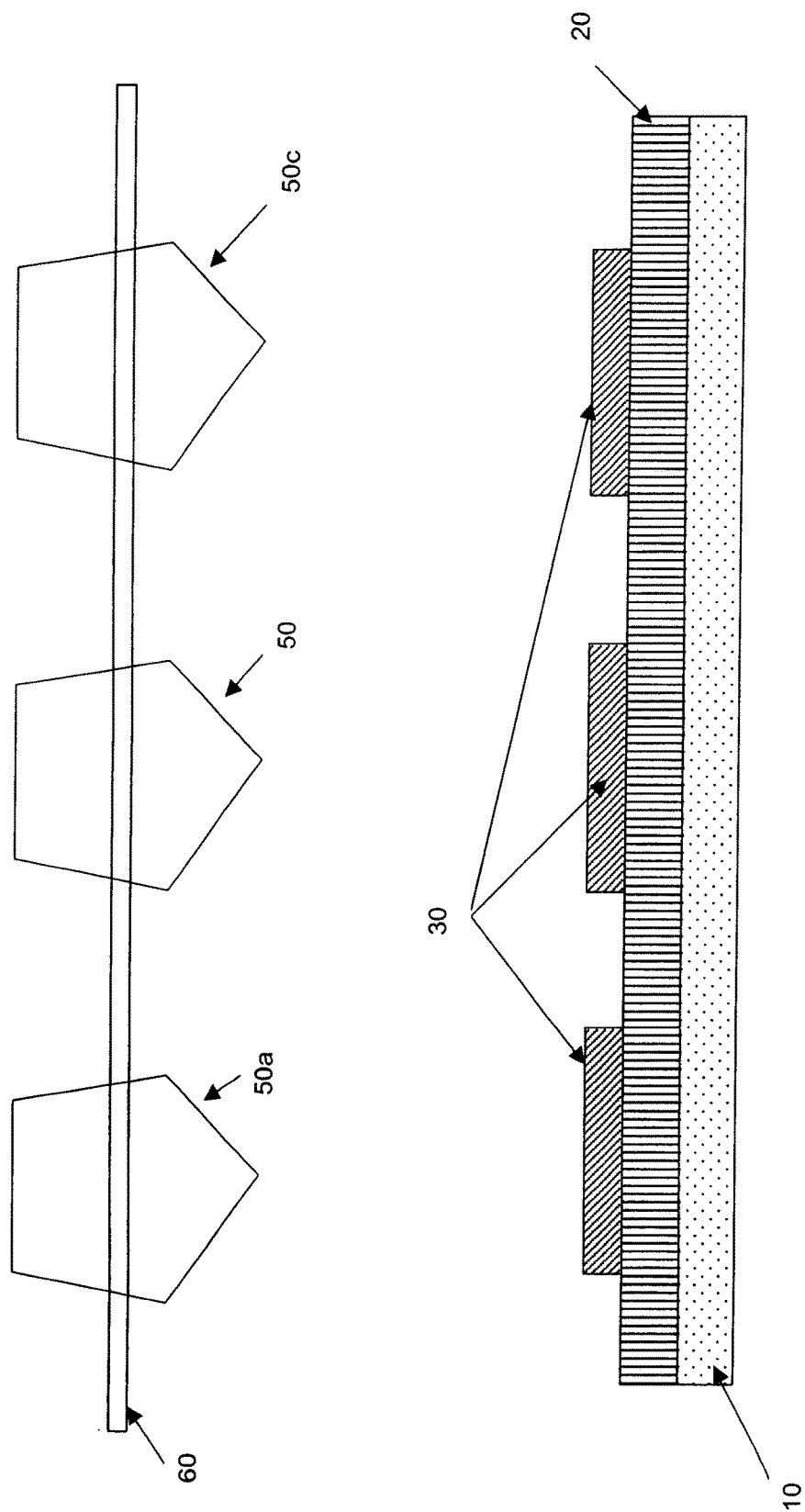
FIG. 4 is a schematic illustration of the side view of delivery of the material used to form the image layer for making the polymer film graphics of the present invention.

Referring to FIG. 4, there is depicted in cross section of one embodiment of a process for delivery of the material used to produce the image layer 30 to the substrate 10. Dispensing heads 50a, 50b, 50c, are attached to a dispensing head rail 60. In one embodiment, dispensing heads 50a, 50b, 50c are digitally driven by computer (not shown) to dispense layer 30 in letter or design form as desired. In one embodiment, the motion of the substrate 10 past the dispensing heads 50a, 50b, 50c is digitally driven by computer (not shown). The material of image layer 30 is dispensed onto substrate 10 having release layer 20. In one embodiment, the material of image layer 30 is dispensed by spraying. In one embodiment, the material of image layer 30 is dispensed by powder coating. The thickness of the layer dispensed depends upon the application for which it is intended and will be, in one embodiment, from about 0.001 mil to about 15 mils, and in one embodiment, from about 1.0 mils to about 5 mils. The thickness of the film 30 dispensed will be controlled by the speed of the applicator roll as well as the gap between the dispensing heads 50a, 50b, 50c and the applicator roll and pressure applied to the spray nozzle.

Figure 5:
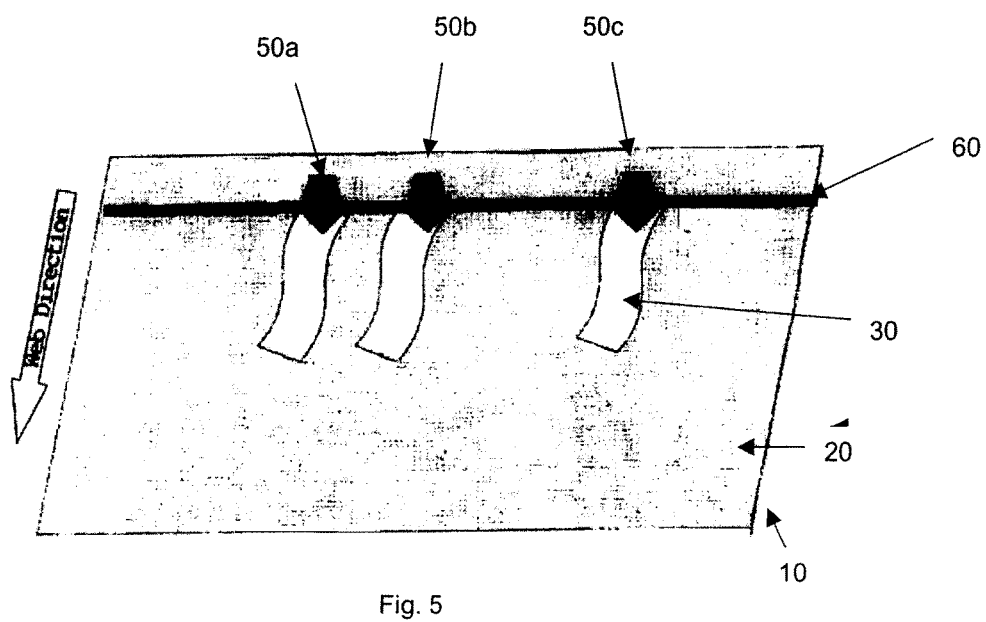
FIG. 5 is diagram of an apparatus for the dispensing process for making the polymer film graphics of the present invention.

A representation of one embodiment of the inventive process is shown in FIG. 5, in which an applicator roll carries the substrate 10 coated with release layer 20. Substrate 10 proceeds past dispensing heads 50a, 50b, 50c disposed over substrate 10 on dispensing head rail 60 and dispense material to produce image layer 30 in a desired letter or design onto substrate 10. In one embodiment, substrate 10 proceeds past a second set of dispensing heads (not shown), from which is dispensed adhesive layer 40 onto image layer 30 so as to conform with adhesive layer 40 graphic. Substrate 10 with dispensed image layer 30 and adhesive 40 layers are then thermally cured or radiation cured. In one embodiment, following application of the image layer 30 to substrate 10, substrate 10 will then proceed to curing prior to application of adhesive layer 40.

Figure 3:
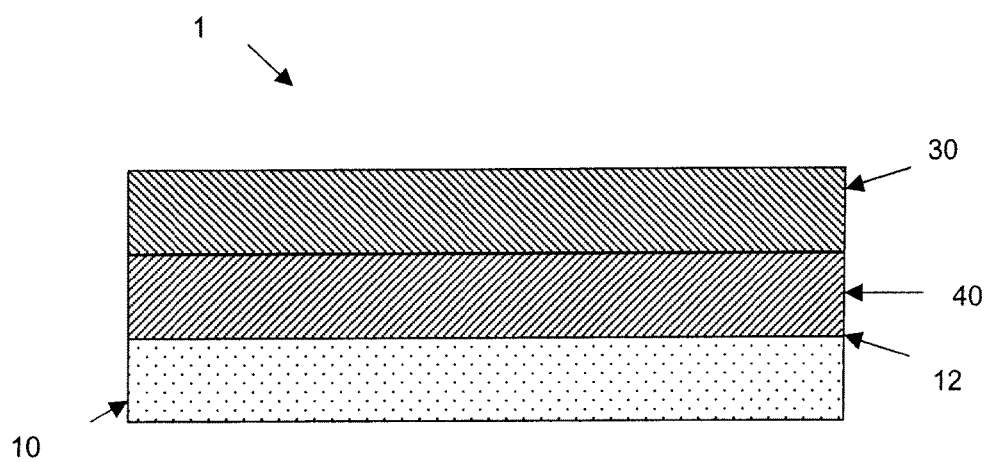
FIG. 3 is a schematic illustration of the side view of a further embodiment of the present invention.

In one embodiment, as illustrated in FIG. 3, upper surface 12 of substrate 10 is coated with adhesive layer 40 in the shape of a desired letter or design. The material used to produce image layer 30 is then dispensed over adhesive layer 40 so as to conform to and have the same shape as adhesive layer 40 letter or design.

Curing of the image layer 30 and adhesive 40 layers can be effected in a continuous manner by passing the coated substrate through equipment that is designed to provide the layers 30, 40 with sufficient residence time to completely cure the layers 30, 40. Curing may be effected at or near atmospheric pressure, in one embodiment, in an inert atmosphere such as nitrogen or argon. The length of exposure necessary to cure the layers 30, 40 varies with such factors as the particular formulation used, the type and wavelength of radiation, dosage rate, the atmosphere, energy flux, concentration of photoinitiator (when required), and the thickness of the layers 30, 40. Generally, the exposure is quite brief and curing is completed in less than about 1 minute. The actual exposure time required to give proper curing for various coatings can be readily determined by one skilled in the art with a minimum of experimentation. Where thermal curing is utilized, oven temperatures will range from about 230° F. to about 420° F.

Figure 6:
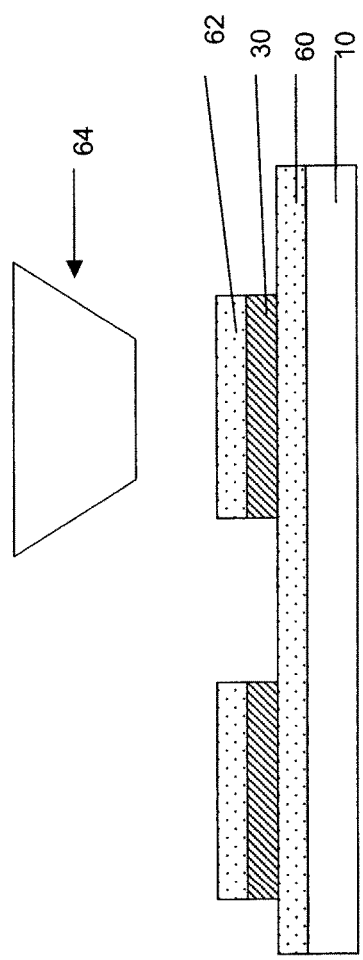
FIG. 6 is a schematic illustration of an alternative embodiment wherein the polymer film graphic is prepared on an adhesive coated substrate.
Figure 7:
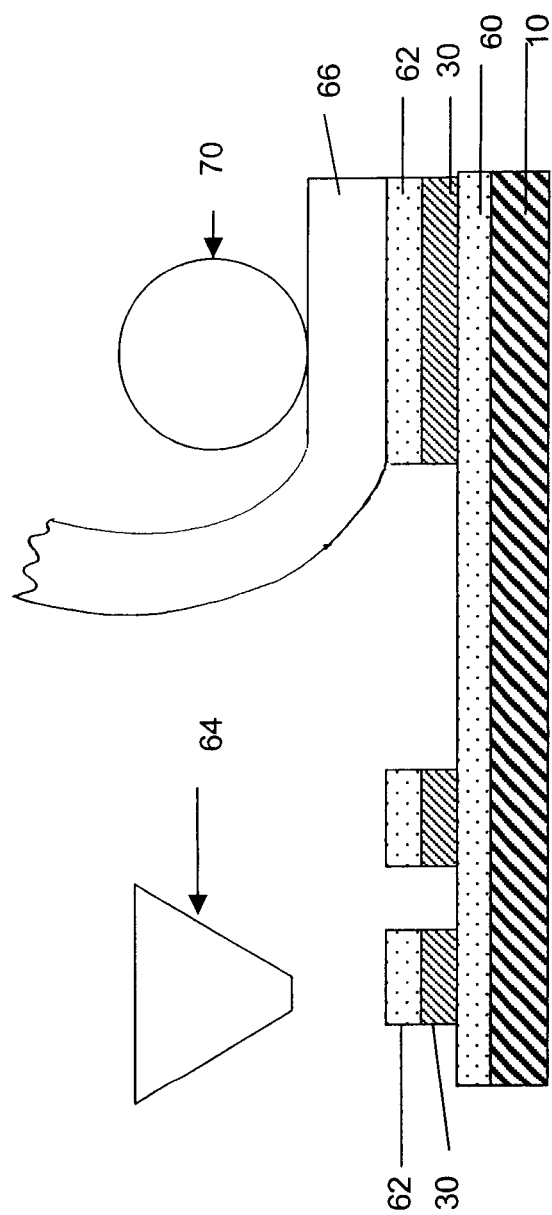
FIG. 7 is a schematic illustration of an alternative embodiment wherein a release liner is laminated to the polymer film graphic.

In one embodiment illustrated in FIGS. 6 and 7, the process for producing the graphic includes printing an ink layer or pattern 30 in the desired shape over or laminated to an adhesive layer 60 that is adhered to a paper or polymeric substrate 10. The printing is accomplished by laying down or creating an ink film 30, such as by using a digital printer 64. The ink is permitted time to cure, such as by the application of ultraviolet energy, and/or allowing the solvent to evaporate prior to applying a second adhesive layer 62 to the surface of the ink. A release liner may be applied to the second adhesive layer 62 by a laminating roll as illustrated in FIG. 7.

The image layer 30 may be prepared in reverse image format, particularly if a clear or transparent substrate 10 is used. Alternatively, the image is printed or prepared such that the image is visible in normal sight configurations, depending on the design and layout of the product. Once the material used to form the image layer exits the printer, it is then applied to or laminated to the adhesive layer.

A clear ink or an ink that becomes clear upon curing may be applied over the image layer or as part of the image layer, which may eliminate the need for adding a clear protective film layer over the top of the image layer. Alternatively, a clear ink layer can be used to complement the protective layer, such as by creating screening or shading.

While the invention has been explained in relation to its preferred embodiments, it is to be understood that various modifications thereof will become apparent to those skilled in the art upon reading the specification. Therefore it is to be understood that the invention disclosed herein is intended to cover such modifications as fall within the scope of the appended claims.

What we claim is:

1. A process for the manufacture of polymer film graphics to eliminate waste film, the process comprising:
    providing a continuous substrate having a first and second surface, and having a first release layer on the first surface and a second silicone release layer on and in direct contact with the second surface, wherein the first release coating composition comprises a silicone release composition;
    applying an image layer as a reverse image with a digital printer, the image layer comprising a plastisol having a plasticizer in the shape of a graphic letter or design to the first release layer;
    applying an ink over part or as part of the image layer;
    depositing an adhesive layer onto the image layer, so that the adhesive layer overlies completely and conforms with the image layer and the adhesive layer has the same shape as the image layer graphic letter or design;
    curing the adhesive and image layers; and
    placing a release liner over the adhesive layer.

2. The process of claim 1, wherein the substrate comprises a paper, a polymer film, or a combination thereof.

3. The process of claim 1, wherein the adhesive comprises a pressure sensitive adhesive.

4. The process of claim 3, wherein the adhesive comprises an acrylic adhesive.

5. The process of claim 3, wherein the adhesive comprises a hot melt adhesive.

6. The process of claim 1, wherein the image layer further comprises one or more of an organosol, a polyethylene, a polypropylene, an acrylic, and an epoxy.

7. The process of claim 1, wherein the image layer comprises a polyvinyl chloride resin and a plasticizer which is provided in an amount of 20 to about 130 parts per hundred of the polyvinyl chloride resin.

8. The process of claim 1, wherein the adhesive layer and image layer are cured at a temperature within the range of about 2300 to about 420° F. for a period of less than 1 minute.

9. The process of claim 1 further comprising winding the polymer film graphic into a roll.

10. The process of claim 1, wherein a clear ink is applied over the image layer after the step of applying the image layer and before the step of depositing the adhesive layer.

11. The process of claim 1, wherein the image layer has a thickness ranging from about 0.001 mils to about 15 mils.

12. The process of claim 1, wherein the adhesive layer includes pigments.

13. The process of claim 1, wherein the image layer is formed from a polymeric material.

14. The process of claim 1, wherein the continuous substrate comprises a polyolefin or a polyester.

15. The process of claim 14, wherein the polyester is polyethylene terephthalate.

16. The process of claim 1, wherein the continuous substrate comprises paper.

17. The process of claim 1, wherein the continuous substrate comprises paper and a polymer film.

18. A process for the manufacture of polymer film graphics comprising:
   providing a continuous substrate having a first and second surface, having a first silicone release layer on the first surface, and having a second silicone release layer on and in direct contact with the second surface;
   applying an image layer in the shape of a graphic letter or design to and in direct contact with the first release layer;
   depositing an adhesive layer onto the image layer, so that the adhesive layer having the same shape as the image layer graphic letter or design; and
   curing the adhesive and image layers.

19. The process of claim 18, wherein the continuous substrate comprises a polyolefin or a polyester.

20. The process of claim 19, wherein the polyester is polyethylene terephthalate.

* * * * *